United States Patent Office 3,048,568
Patented Aug. 7, 1962

3,048,568
CURING OF ALKALI TERMINATED POLYMERS
James W. Cleary, Bartlesville, Okla., assignor to Phillips Petroleum Company, a corporation of Delaware
No Drawing. Filed July 13, 1959, Ser. No. 826,392
20 Claims. (Cl. 260—79)

This invention relates to self-curing polymers prepared by reacting terminally reactive polymers with a cyclic disulfide. In one aspect the invention relates to solid polymer prepared by heat-curing polymers obtained by reacting polymers containing terminal alkali metal atoms with a cyclic disulfide. In still another aspect of the invention curing is carried out in the presence of a conventional curing system.

As used herein the term "terminally reactive polymer" designates polymer which contains a reactive group at one or both ends of the polymer chain.

It is an object of this invention to provide new and useful polymeric materials and process for their preparation.

Another object of this invention is to provide self-curing polymers from polymers containing terminal alkali metal atoms and process for their preparation.

Still another object of this invention is to provide cured polymers from polymers obtained by reacting polymers containing terminal alkali metal atoms with a cyclic disulfide.

These and other objects of the invention will become more readily apparent from the following detailed description and discussion.

The foregoing objects are realized broadly by reacting a polymer containing terminal alkali metal atoms with a cyclic disulfide and replacing alkali metals in the polymer product with hydrogens to obtain a polymer containing terminal mercapto groups.

In one aspect of the invention the polymer product is subjected to heat whereby molecules of said polymer react with each other to form a cured polymer.

In another aspect of the invention curing of the polymer product is carried out in the presence of a conventional curing system.

The monomers which can be employed in the preparation of polymers containing terminal alkali metal atoms include a wide variety of materials. The preferred monomers are the conjugated dienes containing from 4 to 12 carbon atoms and preferably 4 to 8 carbon atoms, such as 1,3-butadiene, isoprene, piperylene, methylpentadiene, phenylbutadiene, 3,4-dimethyl-1,3-hexadiene, 4,5-diethyl-1,3-octadiene, etc. In addition, conjugated dienes containing reactive substituents along the chain can also be employed, such as for example, halogenated dienes, such as chloroprene, fluoroprene, etc. Of the conjugated dienes the preferred material is butadiene, with isoprene and piperylene also being especially suitable. In addition to the conjugated dienes other monomers which can be employed are aryl-substituted olefins, such as styrene, various alkyl styrenes, paramethoxystyrene, vinylnaphthalene, vinyltoluene, and the like; heterocyclic nitrogen-containing monomers, such as pyridine and quinoline derivatives containing at least 1 vinyl or alphamethyl-vinyl group, such as 2-vinylpyridine, 3-vinylpyridine, 4-vinylpyridine, 3-ethyl-5-vinylpyridine, 2-methyl-5-vinylpyridine, 3,5-diethyl-4-vinylpyridine, etc.; similar mono- and di-substituted alkenyl pyridines and like quinolines; acrylic acid esters, such as methyl acrylate, ethyl acrylate; alkacrylic acid esters, such as methyl methacrylate, ethyl methacrylate, propyl methacrylate, ethyl ethacrylate, butyl methacrylate; methyl vinyl ether, vinyl chloride, vinylidene chloride, vinylfuran, vinylcarbazole, vinylacetylene, etc.

The above compounds in addition to being polymerizable alone are also copolymerizable with each other and may be copolymerized to form terminally reactive polymers. In addition, copolymers can be prepared using minor amounts of copolymerizable monomers containing more than one vinylidene group such as 2,4-divinylpyridine, divinylbenzene, 2,3-divinylpyridine, 3,5-divinylpyridine, 2,4-divinyl-6-methylpyridine, 2,3-divinyl-5-ethylpyridine, and the like.

The terminally reactive polymers in addition to including homopolymers of polymerizable vinylidine compounds and copolymers of conjugated dienes with vinylidine compounds also include block copolymers, which are formed by polymerizing a monomer onto the end of a polymer, the monomer being introduced in such a manner that substantially all of the co-reacting molecules enter the polymer chain at this point. In general, the block copolymers can include combinations of homopolymers and copolymers of the materials hereinbefore set forth. A detailed description of block copolymers containing terminal reactive groups and their method of preparation is set forth in the copending application of R. P. Zelinski, Serial No. 796,277, filed March 2, 1959.

The terminally reactive polymers are prepared by contacting the monomer or monomers which it is desired to polymerize with an organo alkali metal compound. The organo alkali metal compounds preferably contain from 1 to 4 alkali metal atoms, and those containing 2 alkali metal atoms are more often employed. As will be expalined hereinafter, lithium is the preferred alkali metal.

The organo alkali metal compounds can be prepared in several ways, for example, by replacing halogens in an organic halide with alkali metals, by direct addition of alkali metals to a double bond, or by reacting an organic halide with a suitable alkali metal compound.

The organo alkali metal compound initiates the polymerization reaction, the organo radical being incorporated in the polymer chain and the alkali metal being attached terminally at at least one end of the polymer chain. When employing polyalkali metal compounds an alkali metal is attached terminally at each end of the polymer chain. The polymers in general will be linear polymers having two ends; however, polymers containing more than two ends can be prepared within the scope of the invention. These polymers can be represented by the general formula $PT_x$ where P comprises the polymer as previously described and T is an alkali metal, $x$ being an integer of 1 to 4. The general reaction can be illustrated graphically as follows:

$$T-R-T + X[C_4H_6] \longrightarrow T-R[C_4H_6]_x-T$$

Organoalkali    Butadiene
metal compound or $$T-[C_4H_6]_n-R-[C_4H_6]_{x-n}-T$$

or combinations thereof.

A specific example is:

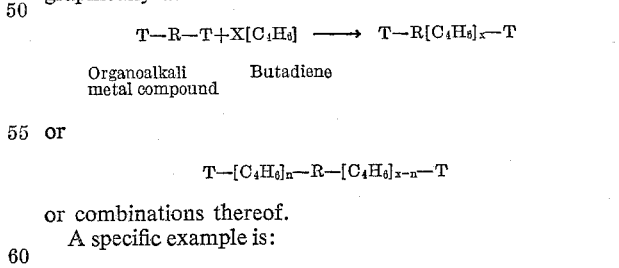

In the specific example 1,4-addition of butadiene is shown; however, it should be understood that 1,2-addition can also occur.

While organo compounds of the various alkali metals can be employed in carrying out the polymerization, by by far the best results are obtained with organolithium compounds which give very high conversions to the terminally reactive polymer. With organo compounds of the other alkali metals, the amount of monoterminally reactive polymer, that is, polymer having alkali metal at only one end of the chain is substantially higher. The alkali metals, of course include sodium, potassium, lithium, rubidium, and cesium. The organic radical of the organo alkali metal compound can be an aliphatic, cycloaliphatic or aromatic radical. For example, mono, di- and polyalkali metal substituted hydrocarbons can be employed including methyllithium, n-butyllithium, n-decyllithium, phenyllithium, naphthyllithium, p-tolyllithium, cyclohexyllithium, 4-butylphenylsodium, 4-cyclohexylbutylpotassium, isopropylrubidium, 4-phenylbutylcesium, 1,4-dilithiobutane, 1,5-dipotassiopentane, 1,4-disodio-2-methylbutane, 1,6-dilithiohexane, 1,10-dilithiodecane, 1,15-dipotassiopentadecane, 1,20-dilithioeicosane, 1,4-disodio-2-butene, 1,4-dilithio-2-methyl-2-butene, 1,4-dilithio-2-butene, 1,4-dipotassio-2-butene, dilithionaphthalene, disodionaphthalene, 4,4'-dilithiobiphenyl, disodiophenanthrene, dilithioanthracene, 1,2-dilithio-1,1diphenylethane, 1,2-disodio-1,2,3-triphenylpropane, 1,2-dilithio-1,2-diphenylethane, 1,2-dipotassiotriphenylethane, 1,2-dilithiotetraphenylethane, 1,2-dilithio-1-phenyl-1-naphthylethane, 1,2-dilithio-1,2-dinaphthylethane, 1,2-disodio-1,1-diphenyl-2-naphthylethane, 1,2-dilithiotrinaphthylethane, 1,4-dilithiocyclohexane, 2,4-disodioethylcyclohexane, 3,5-dipotassio-n-butylcyclohexane, 1,3,5-trilithiocyclohexane, 1-lithio-4-(2-lithiomethylphenyl)butane, 1,2 - dipotassio - 3 - phenylpropane, 1,2-di(lithiobutyl)benzene, 1,3-dilithio-4-ethylbenzene, 1,4-dirubidiobutane, 1,8-dicesiooctane, 1,5,12-trilithiododecane, 1,4,7 - trisodioheptane, 1,4 - di(1,2, - dilithio-2-phenylethyl)benzene, 1,2,7,8-tetrasodionnaphthalene, 1,4,7,10-tetrapotassiodecane, 1,5-dilithio-3-pentyne, 1,8-disodio-5-octyne, 1,7-dipotassio-4-heptyne, 1,10-dicesio-4-decyne, 1,11-dirubidio-5-hendecyne, 1,2-disodio-1,2-diphenylethane, dilithiophenanthrene, 1,2-dilithiotriphenylethane, 1,2 - disodio - 1,2 - diphenylethane, dilithiomethane, 1,4 - dilithio - 1,1,4,4 - tetraphenylbutane, 1,4-dilithio-1,4-diphenyl-1,4-dinaphthylbutane, and the like.

While the organo alkali metal initiators in general can be employed, certain specific initiators give better results than others and are preferred in carrying out the preparation of the terminally reactive polymers. For example, of the condensed ring aromatic compounds the lithium-naphthalene adduct is preferred, but the adducts of lithium with anthracene and biphenyl can be employed with good results. Of the compounds of alkali metals with polyaryl-substituted ethylenes, the preferred material is 1,2-dilithio-1,2-diphenylethane (lithium-stilbene adduct). Ordinarily the dilithio compounds are preferred as being more effective in promoting the formation of the terminally reactive polymers. The organo dialkali metal compounds which have been set forth as being preferred, are those which when prepared contain a minimum of the monoalkali metal compound.

The amount of initiator which can be used will vary depending on the polymer prepared, and particularly the molecular weight desired. Usually the terminally reactive polymers are liquids, having molecular weights in the range of 1000 to about 20,000. However, depending on the monomers employed in the preparation of the polymers and the amount of initiator used, semi-solid and solid terminally reactive polymers can be prepared having molecular weights up to 150,000 and higher. Usually the initiator is used in amounts between about 0.25 and about 100 millimoles per 100 grams of monomer.

Formation of the terminally reactive polymers is generally carried out in the range of between —100 and +150° C., preferably between —75 and +75° C. The particular temperatures employed will depend on both the monomers and the initiators used in preparing the polymers. For example, it has been found that the organolithium initiators provide more favorable results at elevated temperatures whereas lower temperatures are required to effectively initiate polymeriatzion to the desired products with the other alkali metal compounds. The amount of initiator employed can vary but is preferably in the range of between about 1 and about 30 millimoles per 100 grams of monomers. It is preferred that the polymerization be carried out in the presence of a suitable diluent, such as benzene, toluene, cyclohexane, methylcyclohexane, xylene, n-butane, n-hexane, n-heptane, isooctane, and the like. Generally, the diluent is selected from hydrocarbons, e.g., paraffins, cycloparaffins, and aromatics containing from 4 to 10 carbon atoms per molecule. As stated previously, the organodilithium compounds are preferred as initiators in the polymerization reaction since a very large percentage of the polymer molecules formed contain two terminal reactive groups, and also the polymerization can be carried out at normal room temperatures. This is not to say, however, that other organo alkali metal initiators cannot be employed; however, usually more specialized operation or treatment is required with these materials, including low reaction temperatures. Since it is desirable to obtain a maximum yield of terminally reactive polymer, it is within the scope of the invention to use separation procedures, particularly with alkali metal initiators other than lithium compounds, to separate terminally reactive polymer from the polymer product.

The terminally reactive polymers prepared as hereinbefore described contain an alkali metal atom on at least one end of the polymer chain and the organo radical of the initiator is present in the polymer chain. These polymers are rendered self-curing by reaction with a cyclic disulfide selected from the group consisting of

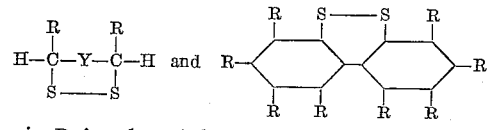

wherein R is selected from the group consisting of hydrogen and alkyl radicals containing from 1 to 30 carbon atoms, and Y is a divalent organic radical containing from 1 to 12 chain members (not necessarily carbon) selected from the group consisting of alkylene radicals, alkenylene radicals and radicals containing groups selected from the group consisting of

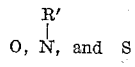

said groups being linked between carbon atoms, where each R' is an alkyl radical containing 1 to 3 carbon atoms.

The reaction, in which P is a polymer, in its simplest form is believed to occur as follows

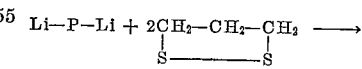

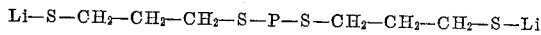

Specific cyclic disulfides which can be used in carrying out the invention include 1,2-dithiacyclopentane,
1,2-dithiacyclohexane,
1,2-dithiacycloheptane,
1,2-dithiacyclodecane,
1,2-dithiacyclododecan,
1,2-dithiacyclotetradecane,
4,4-dimethyl-1,2-dithiacyclopentane,
3,5-dimethyl-1,2-dithiacyclopentane,
4,5-diethyl-1,2-dithiacyclohexane,
6,11-dimethyl-8-propyl-1,2-dithiacyclotetradecane,
1,2-dithia-5-oxacycloheptane,
1,2,5-trithiacyclooctane,
6-methyl-1,2-dithia-6-azacyclononane,
1,2-dithiacyclohex-4-ene, 1,2-dithiacycloocta-4,6-diene,
1,2-dithia-5,8-dioxacyclodecane,
2,2'-biphenylene disulfide,
4,4'-dimethyl-2,2'-biphenylene disulfide,
3,5-diethyl-2,2'-biphenylene disulfide,
4,4'-diisopropyl-2,2'-biphenylene disulfide,
1,2-dithiacyclohexadecane,
3,4,5,6-tetramethyl-1,2-dithiacyclohexadecane,
3,5,7-tri-n-propyl-1,2-dithiacycloheptane,
1,2-dithiacyclohexadeca-5,7,11,13-tetraene,
3,16-dimethyl-1,2-dithiacyclohexadeca-5,8,11,14-tetraene,
1,2-dithiacyclodeca-4,6,8-triene,
3,5,7-triisopropyl-1,2-dithiacyclohexane,
3-methyl-6-ethyl-1,2-dithiacyclohexane,
3,6-diisopropyl-1,2-dithiacyclohex-4-ene,
1,2-dithiacyclopent-3-ene,
3-methyl-8-ethyl-1,2-dithiacycloocto-5-ene,
1,2-dithia-6-oxacyclononane,
3,5-dimethyl-1,2-dithiacyclopent-3-ene,
3,10-dimethyl-1,2-dithia-5,8-dioxacyclodecane,
5-ethyl-1,2-dithia-5-azacycloheptane,
3,8-diethyl-4,7-dimethyl-1,2-dithia-4,7-diazacyclodecane,
4-methyl-1,2-dithia-4-azacyclopentane,
5,7-dimethyl-1,2-dithia-5,7-diazacyclononane,
3-methyl-7-ethyl-1,2,5-trithiacycloheptane, and
1,2,5,9-tetrathiacycloundecane.

While any of the above and other compounds can be employed the preferred cyclic disulfides are 1,2-dithiacyclopentane, 1,2-dithiacyclohexane and 1,2-dithiacycloheptane. Cyclic disulfides can be prepared according to the method of Tobolsky et al., U.S. Patent 2,728,750. Barber and Smiles, J. Chem. Soc. 1928, 1141–1149, describe a method of preparing compounds such as 2,2'-biphenylene disulfide.

In carrying out the preparation of the self-curing polymer the cyclic disulfide is added to an unquenched solution of terminally reactive polymer. By "unquenched polymer" is meant polymer which has not been treated with any type of reagent to inactivate the initiator. Addition of cyclic disulfide to the polymer solution can be effected by a number of methods. For example, the cyclic disulfide can be added to the unquenched polymer solution in the dry state or as a solution, or in the alternative, polymer solution can be added to a solution of the cyclic disulfide. Suitable solvents for the disulfides include materials which are employed as diluents in the preparation of the polymers containing terminal alkali metal atoms. Whichever method is employed, it is desirable that the operation be carried out in such a manner as to maintain the system as fluid as possible. When a polymer chain has only one active end group, the reaction system ordinarily remains fluid when the cyclic disulfide is added. In such instances the disulfide can be employed without first dissolving it in the solvent and can be added all at once. In the situations where it is more difficult to keep the system fluid, i.e., when there are a plurality of active end groups present, the cyclic disulfide is preferably employed as a solution. The disulfide can be added incrementally to the polymer solution with agitation after each addition or slow continuous addition with simultaneous agitation can be employed. Generally, the same type of addition procedure is used when a polymer solution is added to a solution of the disulfide.

After all of the disulfide reagent has been added to the unquenched polymer solution agitation is usually continued for a period which can vary from 1 minute to as long as 24 hours or longer.

Reaction of the cyclic disulfide with the terminally reactive polymer can be carried out over a wide range of temperature. In general a suitable reaction temperature is −100 to +100° C., and preferably from about −30 to +50° C. The particular reaction temperature employed is determined by the nature of the polymer being treated and by the disulfide treating agent which is used. The amount of cyclic disulfide which is provided in the reaction system is sufficient to provide a self-curing polymer composition. Usually the cyclic disulfide is added to the unquenched polymer solution in an amount to provide at least 50 percent of the maximum titratable mercaptan that can be obtained, i.e., at least 0.5 mole of cyclic disulfide per gram atom of alkali metal present in the polymer. An excess of cyclic disulfide can be used but preferably not more than about three moles are added per gram atom of alkali metal. The product which is obtained from the treatment of the terminally reacted polymer with the cyclic disulfide is hydrolyzed or reacted with a reagent which is capable of replacing the alkali metal atoms with hydrogen atoms. Suitable reagents which can be used include dilute mineral acids, glacial acetic acid, or other organic acids, a mixture of acid and alcohol, and the like. This reaction, in which P is polymer, takes place generally as follows

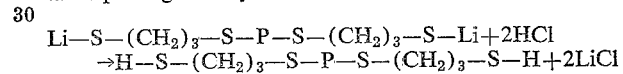

Although the alkali metal mercaptide can be titrated to determine the number of active polymer end groups, it is apparent from the foregoing reaction that the hydrolysis step converts alkali metal mercaptide groups in the polymer to mercapto groups, which can also be titrated to determine the number of active end groups present in the polymer composition. A convenient method for determining titratable mercaptan is the amperometric method using silver nitrate. Recovery of the polymer composition containing mercapto end groups can be effected by washing the polymer solution with water to remove any water soluble ingredients followed by removal of solvent, for example, by evaporation under reduced pressure or by precipitation of the polymer from the solvent with an alcohol such as methanol, ethanol, isopropanol and the like. The product can then be dried under vacuum in an inert atmosphere such as nitrogen or carbon dioxide. Before separation of the polymer product from the hydrocarbon solvent, it may be desirable to add an antioxidant, for example, a conventional rubber antioxidant such as phenyl-beta-naphthylamine, di-tert-butylhydroquinone, 2,2'-methylene bis(4-methyl-6-tert-butylphenol) or the like.

The polymer products of this invention are self-curing, i.e., they can be cured by heating alone, without the use of auxiliary curatives. The curing occurs by reaction of the mercapto groups with double bonds in th same or different polymer chains and the degree of cure which results is determined by the amount of mercapto groups in the polymer.

The curing reaction can be illustrated as follows

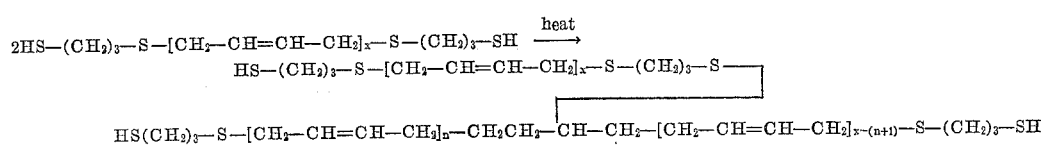

where $n$ can vary from 0 to $x-1$.

Curing is usually carried out by heating the polymer to temperatures in the range of between about 100 and about 500° F. and preferably between about 200 and 400° F. The time required for curing depends on the temperature, the particular polymer being cured and the degree of curing desired. Usually curing is carried out over a period ranging from as low as two minutes to as high as 24 hours or higher.

In combination wtih heat curing it is within the scope of the invention to provide conventional auxiliary curing agents, such as sulfur, oxygen, organic peroxides and hydroperoxides, azo bisbutylronitrile and diazo thioethers. Materials which are free radical generators are ordinarily regarded as being useful as curatives in these systems. A particularly effective curing agent is dicumyl peroxide. Other materials well known as rubber curing agents include Santocure (N-cyclohexyl-2-benzothiazyl-sulfenamide), Altax (benzothiazyl disulfide), Methyl Tuads (tetramethyl thiuram disulfide), and N,N-dimethyl-S-tert-butylsulfenyl dithiocarbamate. The auxiliary curing agents can be used when a tighter or greater degree of cure is desired than can be obtained by heat alone.

The self-curing polymers of this invention can be compounded with various reinforcing agents and fillers which are ordinarily employed in the rubber industry, such as carbon black and mineral fillers. Usually the polymers prior to curing are liquid and semi-solid, and are converted by the curing operation to rubbery products. However, it is also within the scope of the invention to cure polymers which are originally rubbery or solid. The wide variety of products obtained when operating in accordance with the invention provide materials which are suitable for use as adhesives, potting compounds, binders in castable compositions and tread stocks.

The reaction between a cyclic disulfide and polymer containing terminal alkali metal atoms is quantitative. The method of this invention therefore has an additional application in that it can be utilized for determining the alkali metal content of polymer by first treating the polymer containing terminal metal atoms with the cyclic disulfide and then measuring the mercaptan content. The amount of mercaptan is a measure of alkali metal atoms originally present in the polymer. Reaction with polymers containing terminal alkali metal atoms and acyclic disulfides is also quantitative and can be utilized for this analytical method.

The following examples are presented in illustration of the invention.

Example I

Butadiene was polymerized in accordance with the following recipe:

| | |
|---|---|
| Butadiene _____ parts by weight__ | 100 |
| Cyclohexane _____do____ | 650 |
| 1-lithiobutane [1] parts by weight__ 2.13 (33.3 millimoles) | |
| Temperature, ° C_____ | 50 |
| Time, hours _____ | 1.25 |
| Conversion, percent_____ | 1.00 |

[1] Employed as a solution in n-pentane.

Polymerization was effected in a 28-ounce bottle. Cyclohexane was charged first, the bottle was purged with prepurified nitrogen, butadiene was added, and then the 1-lithiobutane. After polymerization was complete, 4.01 grams (33.3 millimoles) of 1,2-dithiacyclohexane (1,2-dithiane) was added as a solid to the unquenched polymer solution. The 1,2-dithiane was used in an amount equivalent to the 1-lithiobutane charged. Subsequent to the addition of the 1,2-dithiane, the bottle was shaken at intervals and after 70 minutes a sample was removed and titrated amperometrically with silver nitrate. The result indicated that mercaptan was formed in quantitative yield.

The method described by Barltrop et al., J. Am. Chem. Soc. 76, 4348 (1954), can be used to prepare 1,2-dithiane.

The reaction mixture was treated with 8.3 milliliters of glacial acetic acid to convert the lithium mercaptide to mercaptan. The total mixture was then washed five times with 40-milliliter portions of boiled water after which the solvent was stripped under reduced pressure. Stripping was continued until the product reached constant weight. It was stored under nitrogen. The product was a colorless liquid which had the following properties:

| | |
|---|---|
| Inherent viscosity [1]_____ | 0.16 |
| Gel, wt. percent [2]_____ | 0 |
| Refractive index, $n_D^{25}$ [3]_____ | 1.5158 |
| Sulfur, wt. percent [4]_____ | 2.1 |
| Sulfur, milliequivalents/100 g. polymer____ | 66 |
| Mercaptan sulfur, milliequivalents per 100 grams polymer [5]_____ | 30 |

[1] One-tenth gram of polymer was placed in a wire cage made from 80-mesh screen and the cage was placed in 100 ml. of toluene contained in a wide-mouth, 4-ounce bottle. After standing at room temperature (approximately 25° C.) for 24 hours, the cage was removed and the solution was filtered through a sulfur absorption tube of grade C porosity to remove any solid particles present. The resulting solution was run through a Medalia-type viscometer supported in a 25° C. bath. The viscometer was previously calibrated with toluene. The relative viscosity is the ratio of the viscosity of the polymer solution to that of toluene. The inherent viscosity is calculated by dividing the natural logarithm of the relative viscosity by the weight of the original sample.

[2] Determination of gel was made along with the inherent viscosity determination. The wire cage was calibrated for toluene retention in order to correct the weight of swelled gel and to determine accurately the weight of dry gel. The empty cage was immersed in toluene and then allowed to drain three minutes in a closed wide-mouth, two-ounce bottle. A piece of folded quarter-inch hardware cloth in the bottom of the bottle supported the cage with minimum contact. The bottle containing the cage was weighed to the nearest 0.02 gram during a minimum three-minute draining period after which the cage was withdrawn and the bottle again weighed to the nearest 0.02 gram. The difference in the two weighings is the weight of the cage plus the toluene retained by it, and by subtracting the weight of the empty cage from this value, the weight of toluene retention is found, i.e., the cage calibration. In the gel determination, after the cage containing the sample had stood for 24 hours in toluene, the cage was withdrawn from the bottle with the aid of forceps and placed in the two-ounce bottle. The same procedure was followed for determining the weight of swelled gel as was used for calibration of the cage. The weight of swelled gel was corrected by subtracting the cage calibration. The cage, after removal from the two-ounce bottle, was placed in an aluminum weighing dish of known weight and the cage and dish were placed in a vacuum drying oven at 70–80° C. for one hour after which they were allowed to cool to room temperature and weighed. Subtracting the sum of the weights of the aluminum dish and the cage from the latter weighing gave the weight of the gel which was finally corrected for solution retention on the cage and for soluble polymer remaining within the gel structure.

[3] The sample was placed on the prism of a Model 808 Spencer Lens Company refractometer. The refractive index was determined at 25° C.

[4] The sample (0.1250 gram) was burned in an atmosphere of purified air at 1000° C. and the gases were passed into a 3 weight percent neutralized $H_2O_2$ solution. After the organic matter was burned, pure oxygen was passed through the system for five minutes to insure complete combustion. The solution in which the burned gases were absorbed was titrated as $H_2SO_4$ with 0.0550 N NaOH using methyl purple indicator.

[5] A solution of 0.5410 gram polymer in 50 ml. toluene was prepared and 3.0 ml. of this solution was added to 100 ml. of a 20 volume percent solution of methanol in toluene. One ml. of 30 weight percent ammonium nitrate in concentrated ammonium hydroxide was added and the mixture was titrated amperometrically with a rotating platinum electrode against a Hg—$HgI_2$ electrode, the diffusion current being measured. A 0.0040 N solution of silver nitrate in isopropanol was used in the titration, 2.46 ml. being required. The end point was determined graphically.

The above data show that my invention can be practiced using a monolithio initiator and the terminally reactive polymer formed can be modified with a cyclic disulfide to produce a polymer containing mercapto groups. This liquid polymer can be cured by heating to substantially increase its inherent viscosity.

*Example II*

1,2-dilithio-1,2-diphenylethane was prepared in accordance with the following recipe:

|  | Grams |
| --- | --- |
| Trans-1,2-diphenylethylene | 18 (0.1 mole). |
| Diethyl ether (220 ml.) [1] | 157. |
| Tetrahydrofuran (20 ml.) [2] | 17.8 (0.24 mole). |
| Lithium wire | 1.9 (0.27 gram atom). |

[1] Dried over sodium.
[2] Distilled from lithium aluminum hydride and stored over sodium wire.

Preparation of the initiator was effected in a 12-ounce bottle. The 1,2-diphenylethylene, diethyl ether, and tetrahydrofuran were charged first. The lithium wire was cut diagonally into pieces ¼ inch long and dropped into the bottle which was then capped, flushed five times with prepurified nitrogen, and agitated for approximately 18 hours at 30° C. A sample was withdrawn and titrated with 0.1 N HCl. The total alkalinity was 0.85 N or 0.425 molar with respect to the dilithium compound.

1,2-dilithio-1,2-diphenylethane was employed as the initiator for the polymerization of butadiene using the following recipes:

|  | Parts by Weight | |
| --- | --- | --- |
|  | A | B |
| Butadiene | 100 | 100 |
| Cyclohexane | 780 |  |
| Toluene |  | 870 |
| 1,2-Dilithio-1,2-diphenylethane | [1] 3.88 | [1] 3.88 |
| Temperature, °C | 50 | 50 |
| Time, hours | 0.7 | 0.7 |
| Conversion, percent | 100 | 100 |

[1] (20 moles.)

After the polymerization was complete each reaction mixture was cooled, with agitation, to 5° C. and 40 millimoles of 1,2-dithiane as a 0.5 molar solution in toluene was added slowly with agitation. During the reaction with 1,2-dithiane, the temperature was controlled with a 5° C. bath. Clear, water white clumps of material formed upon the addition of 1,2-dithiane, and as the reactions approached completion, the mixtures set up. Four hours was allowed for each reaction. Two control runs were made in accordance with recipes A and B using the same procedure except that no 1,2-dithiane was added.

Ten milliliters of glacial acetic acid was added to each reaction mixture while the temperature was maintained at 5° C. The mixture which had set up became fluidized upon addition of the acid. This treatment converted the lithium mercaptide end groups to mercapto (SH) groups and lithium acetate precipitated. Samples were withdrawn and titrated amperometrically with silver nitrate. Results gave the following values for milliequivalents of mercaptan per 100 grams of monomer charged:

Recipe A _____ 35.6
Recipe B _____ 34.6

The product from each run was isolated by precipitation in isopropanol with one part by weight of antioxidant AO-2246 [2,2' - methylene-bis(4-methyl-6-tert-butylphenol)] added per 100 parts by weight of monomer charged. The isopropanol was decanted and each product was dried under reduced pressure in a nitrogen atmosphere. The materials were colorless liquids which had the following properties:

|  | Recipe A | | Recipe B | |
| --- | --- | --- | --- | --- |
|  | Control | 1,2-Dithiane | Control | 1,2-Dithiane |
| Inherent Viscosity [1] | 0.23 | 0.81 | 0.23 | 0.50 |
| Gel, wt. percent [2] | 0 | 0 | 0 | 0 |
| Refractive index, $n_D^{25}$ [3] | 1.5112 | 1.5173 | 1.5112 | 1.5159 |
| Sulfur, wt. percent [4] |  | 1.71 |  | 1.65 |
| Sulfur, milliequivalents/100 grams polymer |  | 53.4 |  | 51.6 |
| Mercaptan sulfur, milliequivalents/100 grams polymer [5] |  | 7.30 |  | 7.55 |

[1], [2], [3] Same as in Example I.
[4] The same procedure was used as in Example I with sample weights as follows: A, 0.4433 gram; B, 0.4910 gram. In each case, after the titration was run, barium chloride was added to precipitate the sulfur as BaSO₄. The BaSO₄ was then determined gravimetrically. No difference in total sulfur was found using the two methods.
[5] The procedure of Example I was followed. Details are as follows:

|  | A | B |
| --- | --- | --- |
| Grams polymer in 50 ml. toluene | 0.943 | 1.006 |
| Milliliters polymer solution used | 5.0 | 5.0 |
| Milliliters 0.0040 N AgNO₃ used in titration | 1.72 | 1.90 |

The polymers from recipe A were heated at 298° F. for 1.2 hours while those from recipe B were heated at the same temperature for 2.5 hours. The controls remained fluid after they were heated whereas the 1,2-dithiane-treated polymers became soft, self-cured, solids. Curing during heating was evidenced by changes in viscosity of the 1,2-dithiane-treated polymers, namely from 0.81 to 1.12 for the polymer of recipe A and from 0.50 to 0.73 for the polymers of recipe B.

*Example III*

1,2-dilithio-1,2-diphenylethane was prepared as described in Example II and used as an initiator for the polymerization of butadiene. Polymerization recipes were as follows:

|  | Parts by Weight | | |
| --- | --- | --- | --- |
|  | Recipe A | Recipe B | Recipe C |
| Butadiene | 100 | 100 | 100 |
| Cyclohexane | 780 | 780 | 780 |
| 1,2-Dilithio-1,2-diphenylethane | [1] 1.94 | [2] 0.97 | [3] 0.39 |

[1] 10 millimoles.
[2] 5 millimoles.
[3] 2 millimoles.

Polymerizations were run at 50° C. and were continued to quantitative conversion. The procedure following polymerization was the same as in Example II except that the amount of 1,2-dithiane added was 20, 10 and 4 millimoles, respectively, in runs A, B, and C. A control run in which no 1,2-dithiane was added was made in accordance with each recipe.

After treatment with glacial acetic acid and isopropanol followed by isolation of the polymers, inherent viscosity and gel data were obtained. The mercaptan content (milliequivalents/100 grams polymer) was determined on the dithiane-treated products. All products were then heated at 307° F. and inherent viscosity and gel were determined. Swelling index values were obtained on the dithiane-treated materials. Results were as follows:

order, by syringe. The bottles were then pressured to 25 p.s.i. with nitrogen.

|  | Runs | | | | | |
|---|---|---|---|---|---|---|
|  | A | | B | | C | |
|  | 1 (Control) | 2 | 1 (Control) | 2 | 1 (Control) | 2 |
| Original Polymers: | | | | | | |
| Inherent viscosity [1] | 0.32 | 1.68 | 0.66 | 3.07 | 1.20 | 3.59 |
| Gel, wt. percent [2] | 0 | 0 | 0 | 0 | 0 | 0 |
| Sulfur, wt. percent [4] | ------ | 0.58 | ------ | 0.26 | ------ | 0.10 |
| Sulfur, milliequivalents/100 g. polymer | ------ | 18.1 | ------ | 8.1 | ------ | 3.1 |
| Mercaptan sulfur, milliequivalents/100 g. polymer [5] | ------ | 2.90 | ------ | 0.82 | ------ | 0.67 |
| Heated at 307° F., hours | 2.2 | 1.1 | 2.2 | 1.1 | 2.2 | 1.1 |
| inherent viscosity [1] | 0.37 | 1.81 | 0.61 | 3.76 | 1.18 | (*) |
| gel, wt. percent [2] | 0 | 52 | 0 | 24 | 0 | 70 |
| swelling index [6] | ------ | 61 | ------ | 103 | ------ | 45 |

*Not determined on sample with such a high gel content.
[1,2] Same as in Example I.
[4] The samples were burned at 2500-3000° F. in an atmosphere of pure oxygen. The gases were passed through a 15 weight percent HCl solution. Titration was made continuously as gases were passed through the HCl solution using standard KIO₃ solution (0.1 mg. sulfur per ml.) and starch as the indicator. Weight of samples burned: A-2, 0.0986 g.; B-2, 0.0578 g.; C-2, 0.1223 g.
[5] The procedure of Example I was followed. Details are as follows:

|  | A | B | C |
|---|---|---|---|
| Grams polymer in 50 ml. toluene | 0.718 | 0.734 | 0.714 |
| Milliliters polymer solution used | 5.0 | 5.0 | 5.0 |
| Milliliters 0.0040 N AgNO₃ used in titration | 0.52 | 0.15 | 0.12 |

[6] This determination was made along with the gel determination. Swelling index is calculated by dividing the weight of swelled gel by the weight of dry gel.

The original control polymers from runs A and B were viscous liquids while that from run C was a soft solid. No significant change occurred after heating these materials. The product from run A-2 was a very sticky solid which exhibited cold flow, that from run B-2 was a sticky solid which exhibited some cold flow but much less than in run A-2, and that from run C-2 was a slightly sticky solid. These 1,2-dithiane-treated polymers, when heated, cured to clear or slightly opaque solids. Cured products from runs A-2 and B-2 exhibited slight stickiness while that from run C-2 was not sticky. These data demonstrate that the dithiane-treated products are self-curing.

*Example IV*

Butadiene was polymerized in accordance with the following recipe:

| | |
|---|---|
| Butadiene, grams | 100 |
| Toluene, grams | 580 |
| 1,2-dilithio-1,2-diphenylethane, millimoles [1] | 20 |
| Temperature, °C | 50 |
| Time, hour | 0.6 |
| Conversion, percent | 100 |

[1] Prepared at about 25° C. and allowed to stand overnight. Recipe as follows:
1,2-diphenylethylene (trans-stilbene), g. ___ 18.0 (0.1 mole).
Tetrahydrofuran, ml. ___ 20 (0.24 mole).
Diethyl ether, ml. ___ 220.
Lithium wire, g. ___ 1.7 (0.24 g. atom).

The concentration of the initiator solution was 0.4 molar.

Polymerization was effected in three 28-ounce bottles with ¾ of the recipe being charged to each bottle. Toluene was charged first followed by a five-minute nitrogen purge. The bottles were capped and butadiene and 1,2-dilithio-1,2-diphenylethane were each added, in that After polymerization was complete, a solution of 1,2-dithiane in toluene was added by syringe using 4.8 grams (40 millimoles) per 100 grams butadiene. The dithiane was added in small portions with frequent shaking to facilitate the reaction, five hours being required for addition of the requisite amount to each bottle. The bottles were allowed to stand overnight and 10 ml. of glacial acetic acid was added to each by syringe. The mixtures fluidized immediately upon addition of the acid. The bottles were uncapped and contents poured into 2.5 liters of isopropanol containing 200 ml. of water and 1.5 grams of the antioxidant, 2,2'-methylene-bis(4-methyl - 6 - tert-butylphenol). In this step the materials from the three runs were combined and coagulated. The isopropanol was decanted, the polymer was washed with 100 ml. of isopropanol, and more of the antioxidant was mixed into the polymer by hand, one gram per 100 grams monomer charged being used. The polymer was dried under nitrogen in a vacuum oven at room temperature. It had an inherent viscosity of 0.35 and was gel free.

Two samples of polybutadiene were prepared and isolated in a manner similar to that described above except that they were not treated with 1,2-dithiane. One sample was prepared using a 20 millimole initiator level as given in the foregoing recipe. In the other run, 5 millimoles of initiator was used. The products were gel free and had inherent viscosities of 0.25 and 0.59, respectively.

Curing studies were carried out on the dithiane-treated polymer and on each of the polybutadiene samples. Dicumyl peroxide was used in some runs and a combination of dicumyl peroxide and Hi-Sil 233 in others. (Hi-Sil 233 is a hydrated silica pigment of extremely fine particle size.) All compositions were cured 30 minutes at 307°

F. Gel, swelling index, and $V_r$ values were determined. Results were as follows:

| No. | Polymer | Hi-Sil 233 phr.[a] | Dicumyl Peroxide phr.[a] | Gel[2] Percent | Swelling[6] Index | $V_r$[7] |
|---|---|---|---|---|---|---|
| 1 | Dithiane-treated polybutadiene | | 0.04 | [e]31 | 41 | [b] |
| 2 | ---do--- | | 0.06 | [f]65 | 22 | 0.1080 |
| 3 | ---do--- | | 0.08 | [b] | [b] | 0.1582 |
| 4 | ---do--- | | 0.10 | 81 | 12 | 0.1718 |
| 5 | ---do--- | | 0.2 | 86 | 9 | 0.2007 |
| 6 | ---do--- | | 0.4 | 89 | 9 | 0.2349 |
| 7 | ---do--- | | 0.8 | 92 | 7 | 0.2672 |
| 8 | ---do--- | 50 | 0.08 | | | 0.2322 |
| 9 | ---do--- | 50 | 0.10 | | | 0.2503 |
| 10 | ---do--- | 50 | 0.12 | | | 0.2642 |
| 11 | ---do--- | 50 | 0.14 | | | 0.2850 |
| 12 | ---do--- | 50 | 0.18 | | | 0.2916 |
| 13 | ---do--- | 50 | 0.20 | | | 0.2887 |
| 14 | ---do--- | 50 | 0.30 | | | 0.3253 |
| 15 | Polybutadiene[c] | | 0.5 | [g]0 | | |
| 16 | Polybutadiene[d] | | 0.08 | [h]0 | | |
| 17 | ---do--- | | 0.5 | [b] | [b] | 0.1618 |
| 18 | ---do--- | 50 | 0.5 | [b] | [b] | 0.2105 |

[a] Parts by weight per 100 parts rubber.
[b] Value not determined.
[c] Twenty millimole initiator level used in preparing polymer.
[d] Five millimole initiator level used in preparing polymer.
[e] Inherent viscosity on soluble portion, 0.79.
[f] Inherent viscosity on soluble portion, 0.64.
[g] Inherent viscosity, 0.44.
[h] Inherent viscosity, 0.68.
[2] Same as in Example I.
[6] Same as in Example III.
[7] The $V_r$ determination was made by cutting samples of the cured polymer weighing approximately 1.5 grams from regular tensile slabs, weighing them on an analytical balance and allowing them to swell in n-heptane for six days at 30° C. The swollen specimens were blotted with filter paper and transferred quickly to tared weighing bottles. The volume of imbibed solvent was obtained by dividing the difference between the weight of the swollen sample and the weight of the dry, extracted sample (dried 16 hours at 70° C. in vacuo) by the density of the solvent. Next the dry samples were weighed in methanol and their volume calculated. From this volume was subtracted the volume of fillers (calculated from the recipe and original sample weight) giving the volume of polymer. The latter was used to calculate the volume fraction of polymer in the swollen stock ($V_r$). This method is described in Rubber World, 135, No. 1, 67–73 (1956).

These data show that curing occurred with dicumyl peroxide alone even when used in small quantities. Increasing the amount of the peroxide increased the cure level, as evidenced by gel, swelling index, and $V_r$ data. In runs 15 to 18, the polymers did not contain mercapto groups. No curing occurred in runs 15 and 16, evidenced by lack of gel. Some curing occurred in runs 17 and 18 but not nearly so much as with equivalent quantities of the same compounding ingredients in mercapto-containing polymers. A very satisfactory cure level was achieved in run 3 whereas no curing was obtained using the same amount of dicumyl peroxide in polybutadiene (run 16). It is thus seen that dicumyl peroxide effected curing in addition to that effected by the reactive end groups in the polymer. Gel and swelling index values were not obtained on silica-reinforced stocks.

Sixty grams of the foregoing dithiane-treated polybutadiene was dissolved in 150 ml. toluene, precipitated in one liter of isopropanol containing 0.3 gram of 2,2′-methylene-bis(4-methyl - 6 - tert-butylphenol), decanted, and dried under nitrogen in a vacuum oven at room temperature. The purified product had an inherent viscosity of 0.41 and was gel free.

There was substantially no difference between this polymer and the original dithiane-treated product. The reprecipitated material was compounded using 0.10 phr. dicumyl peroxide and 50 phr. Hi-Sil 233. A sample of the polybutadiene used in runs 16–18 was compounded using 50 phr. Hi-Sil 233 and 0.50 phr. dicumyl peroxide. Both stocks were cured 30 minutes at 307° F. and physical properties determined. Results were as follows:

| Run | Polymer | Hi-Sil 233, phr. | Dicumyl Peroxide phr. | 300% Modulus p.s.i.[8] | Tensile p.s.i.[9] | Elongation Percent[10] |
|---|---|---|---|---|---|---|
| 1 | Dithiane-treated polybutadiene | 50 | 0.10 | 640 | 800 | 410 |
| 2 | Polybutadiene | 50 | 0.50 | | 240 | 100 |

[8,9,10] The 300% modulus, tensile strentth and elongation of the polymer samples were determined by a modification of ASTM D412-51T. Test specimens were died out of slabs 20 mils thick using Type D die. These specimens measured 4″ long and 0.125″ wide in the flat test section. Stress-strain properties were obtained at 73±2° F. The cross-head speed in these tests was 20″ per minute.

The superiority in properties of the dithiane-treated polymer is evident from the foregoing data.

Having thus described the invention by providing specific examples thereof it is to be understood that no undue limitations or restrictions are to be drawn by reason thereof and that many variations and modifications are within the scope of the invention.

I claim:

1. A process for the preparation of a self-curing polymer which comprises reacting a terminally reactive polymer having the formula $PT_x$ wherein P comprises a polymer of polymerizable vinylidene compounds, said polymer having carbon to carbon unsaturation in the main polymer chain, T is a terminally positioned alkali metal, and x is an integer of 1 to 4, with a reactant material selected from the group consisting of

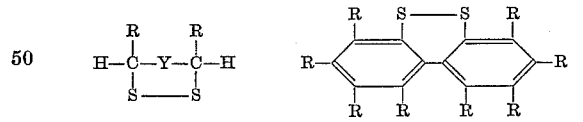

wherein R is selected from the group consisting of hydrogen and alkyl radicals containing 1 to 3 carbon atoms, Y is a divalent organic radical containing from 1 to 12 chain members selected from the group consisting of alkylene radicals, alkenylene radicals and radicals containing groups selected from the group consisting of $$O, \overset{R'}{N}, \text{ and } S$$

said groups being linked between carbon atoms, with each R′ being an alkyl radical containing 1 to 3 carbon atoms, and replacing the alkali metals in the polymer product with hydrogens.

2. The process of claim 1 in which the polymer is a polymer of butadiene and the reactant material is 1,2-dithiacyclohexane.

3. The process of claim 1 in which the polymer is a polymer of styrene and the reactant material is 1,2-dithiacyclohexane.

4. The process of claim 1 in which the polymer is a copolymer of butadiene and styrene and the reactant material is 1,2-dithiacyclohexane.

5. The process of claim 1 in which the polymer is a polymer of isoprene and the reactant material was 1,2-dithiacyclohexane.

6. The process of claim 1 in which the polymer is a polymer of butadiene and the reactant material is 1,2-dithiacyclopentane.

7. The process of claim 1 in which the polymer is a polymer of butadiene and the reactant material is 1,2-dithiacycloheptane.

8. A polymer prepared in accordance with the process of claim 1.

9. A polymer prepared in accordance with the process of claim 2.

10. A process for the preparation of solid polymer which comprises reacting terminally reactive polymer having the formula $PT_x$ wherein P comprises a polymer of conjugated dienes, said polymer having carbon to carbon unsaturation in the main polymer chain, terminally T is a positioned alkali metal, and $x$ is an integer of 1 to 4, with a reactant material selected from the group consisting of

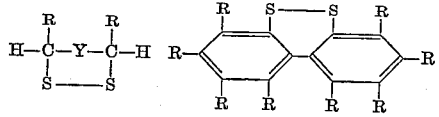

wherein R is selected from the group consisting of hydrogen and alkyl radicals containing 1 to 3 carbon atoms, Y is a divalent organic radical containing from 1 to 12 chain members selected from the group consisting of alkylene radicals, alkenylene radicals and radicals containing groups selected from the group consisting of

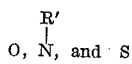

said groups being linked between carbon atoms, with each R' being an alkyl radical containing 1 to 3 carbon atoms, replacing the alkali metals in the polymer product with hydrogens, and thereafter reacting molecules of said polymer by heating at a temperature in the range of 100 to 500° F.

11. The process of claim 10 in which the polymer is a polymer of butadiene and the reactant material is 1,2-dithiacyclohexane.

12. The process of claim 11 in which the reaction of the molecules of said polymer is carried out in the presence of a conventional curing system.

13. Polymer prepared according to the process of claim 10.

14. Polymer prepared according to the process of claim 11.

15. Polymer prepared according to the process of claim 12.

16. A process for the preparation of a self-curing polymer which comprises reacting homopolymer of butadiene containing terminal alkali metal atoms with 1,2-dithiacyclohexane at a temperature in the range of −100 to +100° C. and replacing the alkali metals in the polymer product with hydrogens.

17. A process for the preparation of solid polymer which comprises reacting homopolymer of butadiene containing 2 terminal lithium metal atoms per molecule with 1,2-dithiacyclohexane at a temperature in the range of −100 to +100° C., replacing the alkali metals in the polymer product with hydrogens and thereafter reacting molecules of the hydrolyzed product by heating at a temperature in the range of 100 to 500° F.

18. The process of claim 17 in which heating of the molecules of polymer product is carried out in the presence of a conventional curing system.

19. Polymer prepared according to the process of claim 17.

20. The process of claim 18 in which the conventional curing system comprises dicumyl peroxide.

References Cited in the file of this patent

UNITED STATES PATENTS

| | | |
|---|---|---|
| 2,581,919 | Albert | Jan. 8, 1952 |
| 2,581,930 | Albert | Jan. 8, 1952 |
| 2,605,249 | Albert | July 29, 1952 |
| 2,728,750 | Tobolsky | Dec. 27, 1955 |

OTHER REFERENCES

Barber et al.: J. Chem. Soc., 1928, pp. 1141–1149.
Barltrop et al.: J. Am. Chem. Soc., 76, 4348 (1954)
Gaylord et al.: "Linear and Stereoregular Addition Polymers," pp. 236–237, Interscience Publishers Inc., N.Y. (1959).